United States Patent
Kang et al.

(10) Patent No.: US 12,118,536 B2
(45) Date of Patent: Oct. 15, 2024

(54) SYSTEMS AND METHODS FOR CARD TOKENIZATION VIA API

(71) Applicant: JPMORGAN CHASE BANK, N.A., New York, NY (US)

(72) Inventors: Navneet K. Kang, Garnet Valley, PA (US); John D. Moore, Dublin, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 246 days.

(21) Appl. No.: 16/809,103

(22) Filed: Mar. 4, 2020

(65) Prior Publication Data
US 2021/0279718 A1 Sep. 9, 2021

(51) Int. Cl.
| | |
|---|---|
| G06Q 10/10 | (2023.01) |
| G06Q 20/32 | (2012.01) |
| G06Q 20/34 | (2012.01) |
| G06Q 20/36 | (2012.01) |
| G06Q 20/40 | (2012.01) |
| G06Q 40/02 | (2023.01) |

(52) U.S. Cl.
CPC .......... *G06Q 20/354* (2013.01); *G06Q 10/10* (2013.01); *G06Q 20/3223* (2013.01); *G06Q 20/3672* (2013.01); *G06Q 20/403* (2013.01); *G06Q 40/02* (2013.01)

(58) Field of Classification Search
None
See application file for complete search history.

(56) References Cited

U.S. PATENT DOCUMENTS

| | | | | |
|---|---|---|---|---|
| 10,366,387 | B2 * | 7/2019 | Aabye | G06Q 20/36 |
| 11,461,766 | B1 * | 10/2022 | Kurani | G06Q 20/40 |
| 2014/0019352 | A1 * | 1/2014 | Shrivastava | G06Q 20/12 |
| | | | | 705/41 |
| 2015/0302398 | A1 * | 10/2015 | Desai | G06Q 20/322 |
| | | | | 705/41 |
| 2017/0337542 | A1 * | 11/2017 | Kim | G06Q 20/386 |
| 2018/0247303 | A1 * | 8/2018 | Raj | G06Q 20/027 |

OTHER PUBLICATIONS

"API Driven Innovation in Banking and Finance" Broadcom; https://docs.broadcom.com/doc/api-driven-innovation-in-banking-and-finance; Aug. 21, 2016 (Year: 2016).*
Anderson, James "MasterCard Digital Enablement Service (MDES): Making Digital Payments Happen" Sep. 10, 2014, https://newsroom.mastercard.com/2014/09/10/mastercard-digital-enablement-service-mdes-making-digital-payments-happen/ (Year: 2014 ).*

* cited by examiner

*Primary Examiner* — David P Sharvin
(74) *Attorney, Agent, or Firm* — GREENBERG TRAURIG LLP

(57) ABSTRACT

Systems and methods for card tokenization via API are disclosed. In one embodiment, in a financial institution backend comprising at least one computer processor, a method for card provisioning is provided using a digital enablement service via API may include: (1) receiving, from a digital enablement service and using a first API, a provisioning request from a digital wallet executed by an electronic device, the provisioning request identifying an account for tokenizing; (2) decisioning the provisioning request; (3) communicating the decision to the digital enablement service using a second API; (4) receiving, from the digital enablement service via a third API, a token; and (5) updating a cardholder provide with provisioned status for the token.

5 Claims, 4 Drawing Sheets

SYSTEMS AND METHODS FOR CARD TOKENIZATION VIA API

1. FIELD OF THE INVENTION

The present disclosure generally relates to systems and methods for tokenization of credit and debit cards in digital wallets via API over Internet.

2. DESCRIPTION OF THE RELATED ART

Sending credit card data for every transaction over the Internet is not secure. Thus, tokens, which are aliases for credit card numbers, are used. Token provisioning is often performed using a combination of ISO and API calls.

SUMMARY OF THE INVENTION

Systems and methods for card tokenization via API are disclosed. In one embodiment, in a financial institution backend comprising at least one computer processor, a method for card provisioning is provided using a digital enablement service via API may include: (1) receiving, from a digital enablement service and using a first API, a provisioning request from a digital wallet executed by an electronic device, the provisioning request identifying an account for tokenizing; (2) decisioning the provisioning request; (3) communicating the decision to the digital enablement service using a second API; (4) receiving, from the digital enablement service via a third API, a token; and (5) updating a cardholder provide with provisioned status for the token.

In one embodiment, the method may further include receiving, from the digital enablement service using a fourth API and the third-party wallet provider, a token activation notice to the financial institution.

In one embodiment, the method may further include communicating, to digital wallet via the digital enablement service and using a third, terms and conditions; and receiving acceptance of the terms and conditions from the DES using a fifth API.

In one embodiment, the provisioning request may be received from the digital wallet via the digital enablement service and a digital wallet provider for the digital wallet.

In one embodiment, the step of decisioning the provisioning request may include determining that the account may be eligible for tokenization.

According to another embodiment, in a financial institution backend comprising at least one computer processor, a method for financial institution-initiated token lifecycle servicing using a digital enablement service via API may include: (1) in response to a token lifecycle event, initiating a token lifecycle action for a token; and (2) communicating the token lifecycle action to a digital enablement service using an API, wherein the digital enablement service communicates the token lifecycle action to a digital wallet for the token. The digital wallet executes the token lifecycle action.

In one embodiment, the token lifecycle event may be a token suspension event, a token update event, a token termination event, and a token reissue event.

In one embodiment, a token vault service for the financial institution executes the token lifecycle action, wherein the token vault service provider updates or deletes the token in response to the token lifecycle action.

In one embodiment, a cardholder system of record for the financial institution executes the token lifecycle action.

In one embodiment, the token lifecycle event may be requested by the token holder and may be received by a services system.

In one embodiment, the services system may include an automated response system.

In one embodiment, the services system may include a service representative.

In one embodiment, the token lifecycle event may be received electronically.

According to another embodiment, in a financial institution backend comprising at least one computer processor, a method for digital wallet-initiated token lifecycle servicing via API may include: (1) receiving, from a digital enablement system and from a digital wallet, a token lifecycle event, wherein the token lifecycle event may be received via a first API; (2) executing a token lifecycle action for a token.

In one embodiment, the token lifecycle event may be a token suspension event, a token resume event, and a token termination event.

In one embodiment, a token vault service for the financial institution executes the token lifecycle action, wherein the token vault service provider updates or deletes the token in response to the token lifecycle action.

In one embodiment, a cardholder system of record for the financial institution executes the token lifecycle action.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Embodiments are generally directed to systems and methods for tokenization of credit and debit cards in digital wallets via API.

Figure 1:
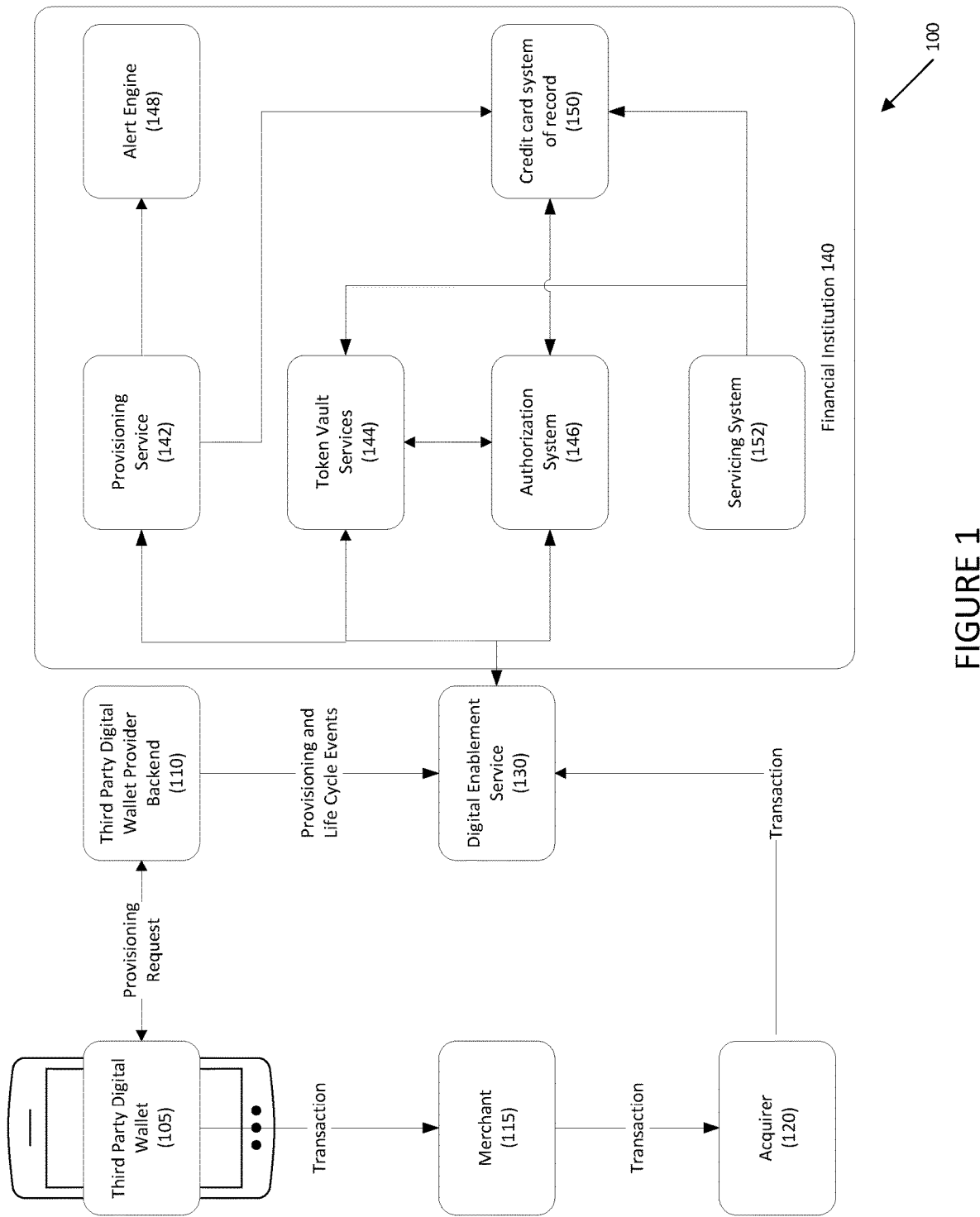
FIG. 1 depicts a system for card tokenization via API are disclosed according to one embodiment.

Referring to FIG. 1, a system for tokenization of credit and debit cards in digital wallets via API is disclosed according to an embodiment. System 100 may include third-party digital wallet 105 executed on an electronic device; third-party digital wallet provider backend 110; merchant 115; acquirer 120; digital enablement service 130; and financial institution 140. Financial institution 140 may include provisioning service 142; token vault services 144; authorization engine 146; alert engine 148; credit card system of record 150; and servicing system 152. In one embodiment, digital wallet 105 may be any suitable digital wallet that is executed by an electronic device. The electronic device may be any suitable electronic device, such as computers, smartphones, smart devices (e.g., smart watches, smart rings, etc.), Internet of Things (IoT) appliances, smart vehicles, etc.

Digital enablement service 130 may interface with wallet backend provider and financial institution 140. Specifically, digital enablement service 140 may receive a provisioning request and/or a lifecycle event. Digital enablement service 130 may communicate the provisioning request to provisioning service 142, and lifecycle event to token vault services 144.

In one embodiment, digital enablement service 130 may be provided by or associated with a third party, such as a card association.

Digital enablement service 130 may also receive a transaction from acquirer 120, and may communicate the transaction to authorization service 146.

Provisioning service 142 may provision the account or card to digital wallet 105. It may communicate alerts using alert engine 148.

Token vault services 144 may process lifecycle events, such as card expirations, card number changes, holds, etc.

Authorization system 146 may authorize a transaction using the digital wallet.

Cardholder system or record 150 may be credit card system of record that may maintain or have access to real time authorization platform data from authorization system 146.

Servicing system 152 may include systems that may be operated by a customer service representative. The customer service representative may be a human, an automated system (e.g., a chatbot), or a combination thereof. For example, a customer service representative may receive a communication (e.g., phone, email, chat, text, etc.) from a customer, and may take an appropriate action by issuing instructions to token vault services 144 and/or credit card system of record 150.

Figure 2:
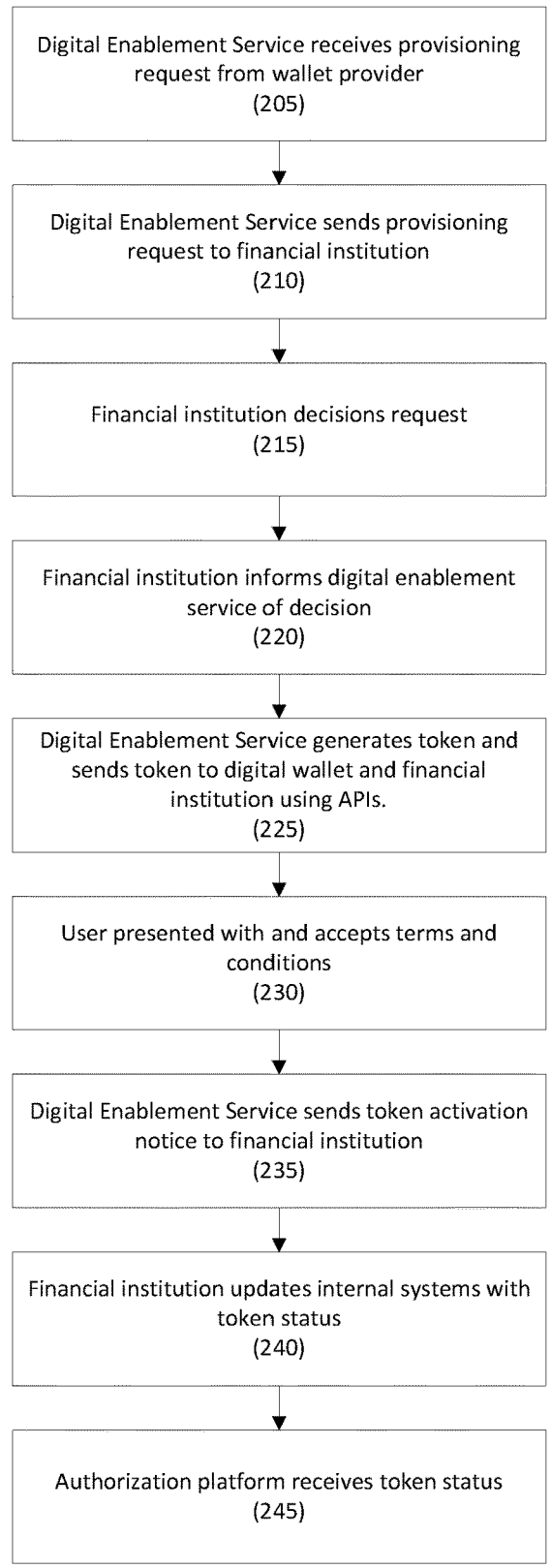
FIG. 2 depicts a method for card provisioning is provided using a digital enablement service via API according to one embodiment.

Referring to FIG. 2, a method for card provisioning is provided using a digital enablement service via API is disclosed according to an embodiment.

In step 205, a digital enablement service may receive a provisioning request from a wallet provider backend. In one embodiment, the provisioning request may originate from a user with a digital wallet executed on an electronic device. In one embodiment, the request may identify a primary account number.

In step 210, the digital enablement service may communicate the provisioning request to the issuing financial institution. The request from the digital enablement service is made by API.

In step 215, the financial institution may decision the request. For example, the financial institution may apply rules, such checking the customer's card status, digital wallet risk, whether the card is eligible for tokenization, etc.

In one embodiment, any additional authentication (e.g., out-of-band, one-time passcode, etc.) may be used as is necessary and/or desired.

In step 220, the financial institution may inform the digital enablement service of the decisioning, and if approved, in step 225, the digital enablement service may generate the token. The digital enablement service may then communicate the token to the digital wallet and to the financial institution using APIs. The digital wallet may receive token from the digital wallet provider.

Following decisioning, in step 230, the user may be presented with, and may accept, terms and conditions. The terms and conditions may be presented in the digital wallet application and may be communicated from the financial institution to the mobile wallet application via the digital enablement service using an API and the third-party wallet provider.

In step 235, after the terms and conditions are accepted, the digital enablement service may send a token activation notice to the financial institution. The notice is sent by API.

In step 240, the financial institution may update the cardholder information with the token status.

In step 245, the financial institution's authorization platform may receive and update the token status.

Figure 3:
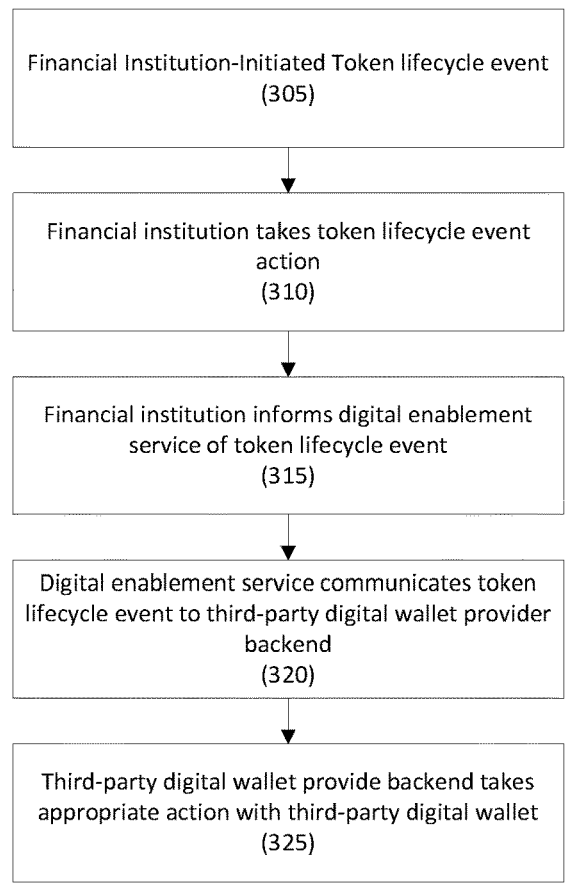
FIG. 3 depicts a method for financial institution-initiated token lifecycle servicing using a digital enablement service via API according to one embodiment.

Referring to FIG. 3, a method for financial institution-initiated token lifecycle servicing using a digital enablement service via API is provided according to one embodiment. Examples of financial institution-initiated token lifecycle events include token delete, token update, token suspend, and token unsuspend.

In step 305, a token lifecycle event may occur. In the embodiment of FIG. 3, the token lifecycle event may be initiated within the financial institution. This may include token lifecycle events that are initiated by a servicing system (e.g., human and/or automated) in response to a customer request. For example, the token lifecycle event may be initiated by a servicing system.

In step 310, the financial institution may initiate the necessary action for the token lifecycle event. Examples include token suspension, update, termination, and reissue.

In step 315, the financial institution may inform the digital enablement service of the token lifecycle event via API. In one embodiment, the financial institution's token vault services may inform the digital enablement service of the token lifecycle event.

In step 320, the digital enablement service may communicate the token lifecycle event to the third party digital wallet provider.

In step 325, the third party digital wallet provider may take the appropriate action with the third party digital wallet.

Figure 4:
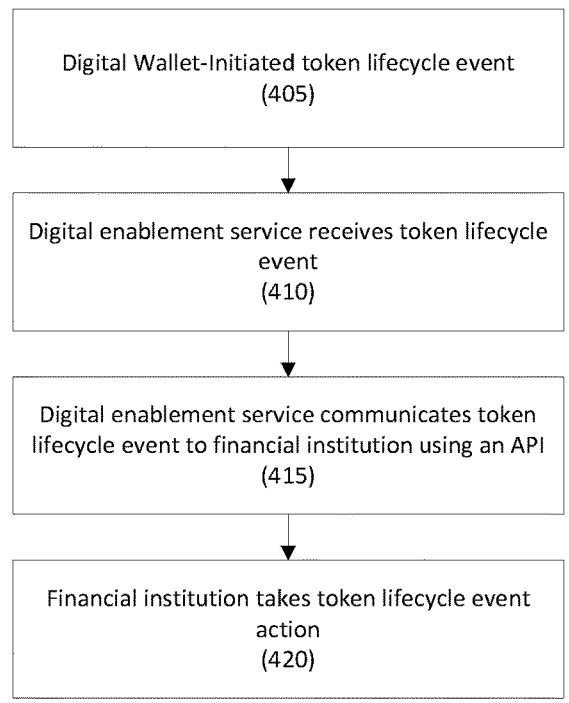
FIG. 4 depicts a method for digital wallet-initiated token lifecycle servicing using a digital enablement service via API according to one embodiment.

Referring to FIG. 4, a method for digital wallet-initiated token lifecycle servicing via API is provided according to one embodiment. Examples of digital wallet-initiated token lifecycle events include token delete, token update, token suspend, and token unsuspend.

In step 405, a token lifecycle event may occur. In the embodiment of FIG. 4, the token lifecycle event may be initiated by the user using the digital wallet.

In step 410, the digital enablement service may receive the token lifecycle event from the digital wallet via the digital wallet provider.

In step 415, the digital enablement service may communicate the token lifecycle event to the financial institution using an API. The financial institution may then route the token lifecycle event to token vault services and/or the credit card system of record.

In step 420, the appropriate financial institution system may take the appropriate action in response to the token lifecycle event.

Exemplary lifecycle events are as follows.

For example, in one embodiment, an account may be closed. This may be initiated by the financial institution, including by the customer calling the financial institution to initiate the closure. Once the account is closed, token vault services may terminate the associated token in the token vault and may inform the authorization platform. Token vault services may also instruct the digital enablement service via an API to delete the token. The digital enablement service may then instruct the wallet provider to delete the token from the wallet provider's wallet.

In another embodiment, a card may be reissued in a manner that requires a BIN change (e.g., a reissue, forced reissue, or product change). This may be initiated by the financial institution. In one embodiment, a card event may be published to token vault services that the card has expired. This may be done at an individual level or at a batch level. In one embodiment, the expiration may be confirmed with the cardholder.

Token vault services may check with the provisioning service to check that the new card is eligible for provisioning, and may then receive new card art for the new card. Token vault services may call a token update on the digital enablement services with the new card number, expiration date, and new configuration identifier. The digital enablement services may then update the card in the digital wallet, and may update the authorization system and cardholder system or record with the token/card mapping change.

In another embodiment, a card may be reissued in a manner that does not requires a BIN change (e.g., reissue, forced reissue, or product change). This may be initiated by the financial institution. In one embodiment, a card event may be published to token vault services that the card has expired, and a new card is provided. Token vault services may terminate the token in the token vault, and may instruct the digital entitlement service via an API to perform a token delete. The digital enablement services may inform the wallet provider, which will remove the token from the wallet. The digital enablement service may update the authorization services and the cardholder services with the token terminations.

In another embodiment, a card may be reissued (e.g., a natural replacement or a customer-requested replacement). This may be initiated by the financial institution or by the digital wallet. For example, the card system of record may publish a card event that the card has a new expiry date with no change to the card number. Token vault services may update the digital entitlement services via API with the new expiry date, and, if necessary, the card number. The digital entitlement services may then update the card in the wallet.

In another embodiment, a card may be lost. For example, a cardholder may report the card as lost without a fraud event via the digital wallet, or may communicate the information to a servicing system. Token vault services may track the card as lost, but no update to the token is necessary. A new card may be issued by the card system of record and token vault services may update the token vault with the new card information.

Token vault service may call digital entitlement services via API with a token update with the new card number and expiration date.

Digital entitlement services may update the card in the wallet, and may update the authorization system and cardholder services with the token/card mapping change.

In one embodiment, the card may be suspended by the customer. For example, the customer may suspend the token in the wallet. The wallet may inform digital entitlement services of the suspension. Digital entitlement services may inform token vault services of the suspension via API. Token vault services may update the token vault, and may also inform cardholder services that the card is suspended.

When the customer resumes using the card (e.g., unsuspends the card), the wallet may inform digital entitlement services of the resumption. Digital entitlement services may inform token vault services of the resumption via API. Token vault services may update the token vault, and may also inform cardholder services that the card is resumed.

In another embodiment, the token expiry date may change. This change may be initiated by the financial institution. In one embodiment, the digital entitlement services may inform token vault services that the expiry date has changed via API. Token vault services may update the token vault with the expiry date change and may inform cardholder services of the change.

It should be recognized that although several different embodiments are disclosed, these embodiments are not exclusive. Thus, although certain features may be disclosed in the context of one embodiment, the features may be used any embodiment as is necessary and/or desired.

Hereinafter, general aspects of implementation of the systems and methods of the embodiments will be described.

The system of the embodiments or portions of the system of the embodiments may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the embodiments.

The processing machine used to implement the embodiments may utilize a suitable operating system. Thus, embodiments may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the methods as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment, be performed by a single component. Further, the processing performed by one distinct component as described above may be performed by two distinct components. In a similar manner, the memory storage performed by two distinct memory portions as described above may, in accordance with a further embodiment, be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the embodiments. Rather, any number of different programming languages may be utilized as is necessary and/or desirable.

Also, the instructions and/or data used in the practice of the embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the embodiments may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the embodiments.

Further, the memory or memories used in the processing machine that implements the embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the embodiments, a variety of "user interfaces" may be utilized to allow a user to interface with the processing machine or machines that are used to implement the embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method of the embodiments may interact partially with another processing machine or processing machines, while also interacting partially with a human user.

It will be readily understood by those persons skilled in the art that the present embodiments are susceptible to broad utility and application. Many embodiments and adaptations other than those herein described, as well as many variations, modifications and equivalent arrangements, will be apparent from or reasonably suggested by the present embodiments and foregoing description thereof, without departing from the substance or scope of the invention.

Accordingly, while the present exemplary embodiments have been described here in detail, it is to be understood that this disclosure is only illustrative and exemplary and is made to provide an enabling disclosure of the invention. Accordingly, the foregoing disclosure is not intended to be construed or to limit the present embodiments or otherwise to exclude any other such embodiments, adaptations, variations, modifications or equivalent arrangements.

What is claimed is:

1. A method for card provisioning using a digital enablement service via API, comprising:
    receiving, at a financial institution backend and from a digital enablement service for a card association via an Application Programming Interface (API), a provisioning request to tokenize an account to a digital wallet executed by an electronic device, the provisioning request comprising an identification of the account, the digital enablement service interfacing with both a third-party wallet provider backend for the digital wallet and the financial institution backend;
    approving, by the financial institution backend, the provisioning request;
    communicating, by the financial institution backend and to the digital enablement service, the approval;
    generating, by the digital enablement service, a payment token for the account in response to receiving the approval;
    communicating, by the digital enablement service, the payment token to the third-party wallet provider, wherein the third-party wallet provider provides the payment token to the digital wallet;
    presenting, by the financial institution backend and via the digital enablement service to the digital wallet, terms and conditions;
    generating, by the digital enablement service, a token activation notice in response to acceptance of the terms and conditions;
    sending, by the digital enablement service, the token activation notice to the financial institution backend; and
    updating, by the financial institution backend, a cardholder card status for the account with a token provisioned status.

2. The method of claim 1, wherein the provisioning request is received from the digital wallet via the digital enablement service and a digital wallet provider for the digital wallet.

3. The method of claim 1, wherein the step of approving the provisioning request comprises determining that the account is eligible for tokenization.

4. A method for card provisioning using a digital enablement service via API, comprising:
    receiving, at a digital enablement service for a card association and from a third-party wallet provider backend, a provisioning request to tokenize an account to a digital wallet executed by an electronic device, the digital enablement service interfacing with both the third-party wallet provider backend and a financial institution backend and an acquirer;
    communicating, by the digital enablement service via an Application Programming Interface (API), the provisioning request to the financial institution backend for a financial institution issuer of the account;
    receiving, by the digital enablement service and from the financial institution backend, approval of the provisioning request;
    generating, by the digital enablement service, a payment token for the account in response to receiving the approval;
    communicating, by the digital enablement service, terms and conditions to the digital wallet;
    receiving, by the digital enablement service, acceptance of the terms and conditions from the digital wallet; and
    communicating, by the digital enablement service and via the API, a token activation notice in response to the acceptance of the terms and conditions, wherein the financial institution backend updates a cardholder card status for the account with a provisioned status.

5. The method of claim 4, further comprising:
    communicating, by the digital enablement service and via the API, the acceptance of the terms and conditions to the financial institution backend.

* * * * *